H. E. DAKIN.
PERMUTATION LOCK FOR AUTOMOBILES.
APPLICATION FILED DEC. 24, 1920.

1,385,343.

Patented July 19, 1921.

Inventor
H. E. Dakin
by Wilkinson & Giusta
Attorneys

UNITED STATES PATENT OFFICE.

HERBERT ERNEST DAKIN, OF LONDON, ENGLAND, ASSIGNOR TO HERBERT E. DAKIN LIMITED, OF LONDON, ENGLAND, A CORPORATION OF GREAT BRITAIN.

PERMUTATION-LOCK FOR AUTOMOBILES.

1,385,343.     Specification of Letters Patent.     Patented July 19, 1921.

Application filed December 24, 1920. Serial No. 433,009.

*To all whom it may concern:*

Be it known that I, HERBERT ERNEST DAKIN, a subject of the King of Great Britain, and resident of 31–33 High Holborn, London, W. C. 1., England, have invented an Improved Permutation-Lock for Automobiles, for which I have filed an application in England Nov. 7, 1919, Patent No. 27,590, of which the following is a specification.

This invention relates to the provision of a code lock for locking the steering pillar or shaft of an automobile or cycle and consists in an improved construction of lock designed to be fitted co-axial with the steering pillar or shaft and to engage and disengage the steering wheel or handle.

According to this invention the steering column is provided with vertically movable tongues which are operated by a series of rings of the code lock type disposed concentrically with the steering pillar and adapted to engage and disengage recesses formed in the steering handle, the engagement of the tongues with the steering handle having the effect of locking same.

In the accompanying drawings which are illustrative of my invention.

Figure 1:
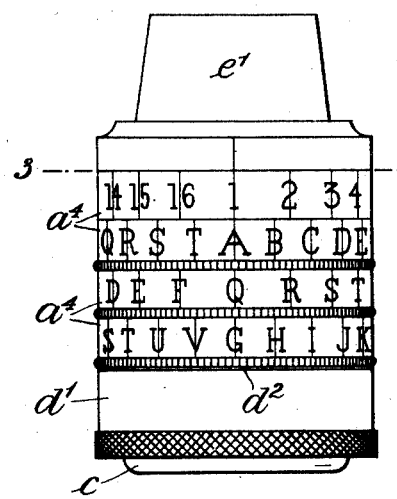

Figure 1 is a view in side elevation.

Figure 2:
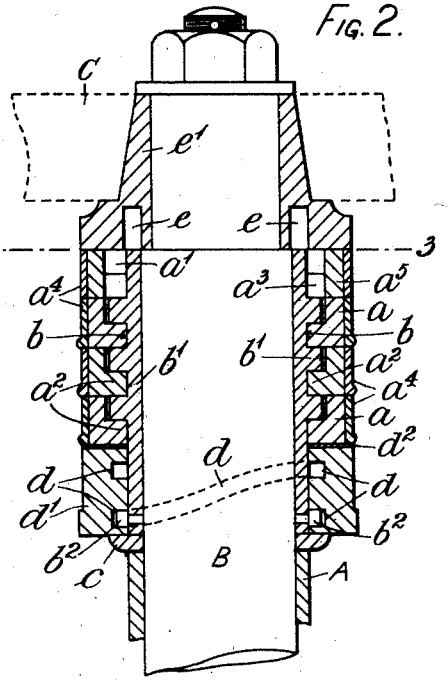

Fig. 2 a view in longitudinal section, and

Figure 3:
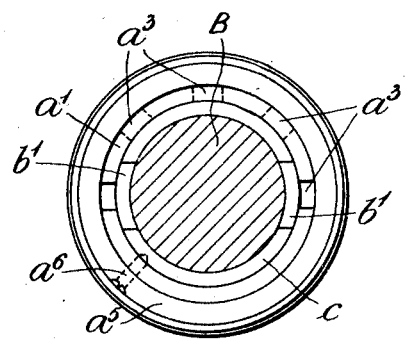

Fig. 3 a sectional view on the line 3—3 in Fig. 1 of a locking device as applied to the steering shaft of an automobile.

Figure 4:
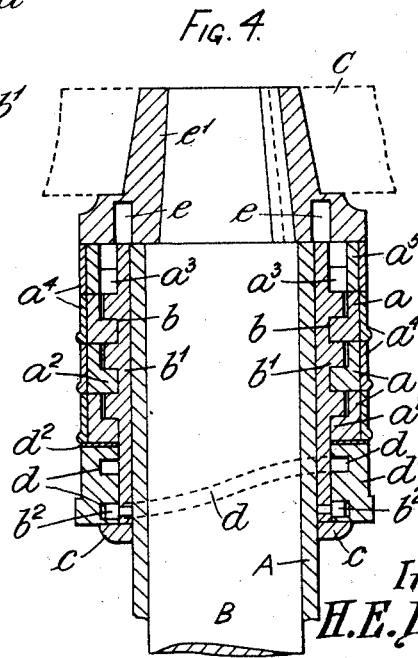

Fig. 4 is a view similar to Fig. 2 illustrative of a modification.

In the application of this invention by way of example to an automobile as shown in Figs. 1–4 the usual steering column A which incloses the steering shaft B is provided at its upper end with a series of rings $a$ superposed the one upon the other, and rotatable about the column A, as shown in Fig. 4 or about the steering shaft B as shown in Fig. 2. Each ring $a$ is channel-shaped internally to form annular grooves $a'$ and the flanges $a^2$ of the channel work in grooves $b$ formed in two or more strips of metal or tongues $b'$ disposed vertically in guides provided in a sleeve $c$ rigidly mounted upon the steering column A or shaft B. The lower ends of these tongues are capable of being moved outward by suitable means, such as a cam groove $d$ formed in a ring $d'$ and engaged by a pin $b^2$ projecting from each tongue $b'$. The ring $d'$ is rotatable so that the tongues may be moved vertically and project above the steering column A or shaft B to engage recesses $e$ formed in a sleeve $e'$ whereon the steering wheel C is mounted. This outward movement is however restrained by the flanges $a^2$ of the aforesaid rings engaging with the grooves in said tongues, thus holding the latter in the retracted position. The flanges in the rings are each formed with grooves or channels $a^3$ corresponding with the number of tongues and the positions of these channels are indicated on the extension of the rings by letters or numerals forming a code. It will be understood that the periphery of each ring is marked with several letters or numerals from which the code is made but known only to authorized persons. By preference the letters or numerals for each ring are marked on a separate strip of metal $a^4$ and the latter is adjustably secured to its ring $a$. With such a construction the code may be changed by altering the position of any strip $a^4$ around its ring $a$ so as to change the position of the letters thereon in relation to the letters on the next ring.

The uppermost ring ($a^5$) is secured by any suitable means such as a screw $a^6$ to the sleeve $c$ which latter in its turn is secured either to the steering shaft B as shown in Figs. 2 and 3 or to the steering column A as shown in Fig. 4.

When it is desired to lock the steering wheel C to the steering shaft B (Fig. 2) or to the steering column A (Fig. 4) the rings $a$, $a$, $a$, are adjusted relatively to the ring $a^5$ to form the code, which for example may be I. A. Q. G. and the indicating mark on the sleeve $e'$ of the steering wheel C is brought opposite to the code. The grooves $a^3$ in the rings $a$ will now be superposed to form continuous channels with the grooves $a^3$ in the ring $a^5$ and provide a free passage for the tongues $b$. If now the ring $d'$ be turned the cam grooves $d$ formed therein will move the tongues $b$ through the medium of the pins $b^2$ in an upward direction and cause the said tongues to engage in the recesses $e$ formed in the sleeve $e'$ whereon the steering wheel is mounted. The rings $a$ $a$ $a$ may now be turned indiscriminately to disturb the code.

According to the construction shown in Fig. 2 the steering wheel when locked as above described will be in a condition to operate the steering gear, but when it is unlocked as shown in the said figure the steering wheel is free and inoperative. The construction shown in Fig. 4 is the reverse of that shown in Fig. 2, the sleeve $e'$ being keyed to the steering shaft B and when locked to the steering column A is immovable.

To prevent rotation of the rings $a$ during the rotation of the ring $d'$ to move the tongues $b'$ an annular-shaped distance piece $d^2$ is interposed between the ring $d'$ and the ring $a$ next in order, the said distance piece being held by projections on the inner edge thereof engaging recesses in the sleeve $c$.

In the application of this invention to cycles the locking device may be mounted upon the steering column in a manner similar to that above described.

What I claim as my invention and desire to secure by Letters Patent is:—

1. In a steering wheel lock the combination with a steering wheel having recesses in the underside of the hub thereof and steering mechanism supporting the wheel, a sleeve fixed to a part of said mechanism and having longitudinal guide grooves in its sides, tongues slidably mounted in said grooves and adapted to enter the said recesses of the hub, a shifting ring mounted to turn on said sleeve and having a cam groove therein for each tongue, pins projecting from the tongues into said cam grooves for actuating the tongues upon turning of the ring, a plurality of code rings arranged in superposed relation about said sleeve and tongues and having interlocking elements adapted to engage the tongues and adapted to be individually turned to free said tongues for operation, and code bearing strips separately mounted on said code rings for individual adjustment thereon whereby the code may be changed from time to time without changing the construction of the code rings.

2. In a lock for steering wheels, the combination with a steering shaft and a steering wheel mounted to freely turn thereon and having recesses in the underside of the hub thereof, a shiftable member mounted from turning on said steering shaft adapted to enter said recesses of the hub for locking the hub to the shaft, a shifting ring rotatable about said shaft and connected to said member for actuating the same, and a plurality of code rings on said member adapted to interlock therewith for holding the member free from said hub and adapted to be relatively adjusted with respect to each other and to the shifting member for freeing the latter and permitting the interlocking of the wheel and shaft for manual operation of the latter.

HERBERT ERNEST DAKIN.